United States Patent [19]
Dumentat

[11] 3,863,394
[45] Feb. 4, 1975

[54] APPARATUS FOR MACHINING WORK PIECES
[75] Inventor: Raymond E. Dumentat, Carlyle, Ill.
[73] Assignee: Speedfam Corporation, Des Palines, Ill.
[22] Filed: Feb. 4, 1974
[21] Appl. No.: 439,318

[52] U.S. Cl............ 51/109 R, 51/123 R, 51/215 CP
[51] Int. Cl............................................. B24b 7/06
[58] Field of Search.......... 51/5, 109 R, 122 R, 123, 51/129, 131, 215 R, 215 CP, 215 H, 215 UE; 198/218, 85; 214/1 BB, 1 BT

[56] References Cited
UNITED STATES PATENTS
1,699,516  1/1929  Anderson............................ 51/134
2,813,380  11/1957  Narel............................. 51/215 CP
3,665,655  5/1972  Klein................................ 214/1 BB
3,731,822  5/1973  Friesen............................ 214/1 BC Primary Examiner—Al Lawrence Smith
Assistant Examiner—Nicholas P. Godici
Attorney, Agent, or Firm—Johnson, Dienner, Emrich, Verbeck and Wagner

[57] ABSTRACT

The apparatus defines at least two work stations, at one of which is disposed an abrading machine having an operating surface, and between which carrier means is reciprocally movable. Power actuated means on the carrier means selectively serves to raise and lower at least one work piece, to transfer the work piece from one work station to the other, and to forcibly urge the work piece against the operating surface.

11 Claims, 6 Drawing Figures

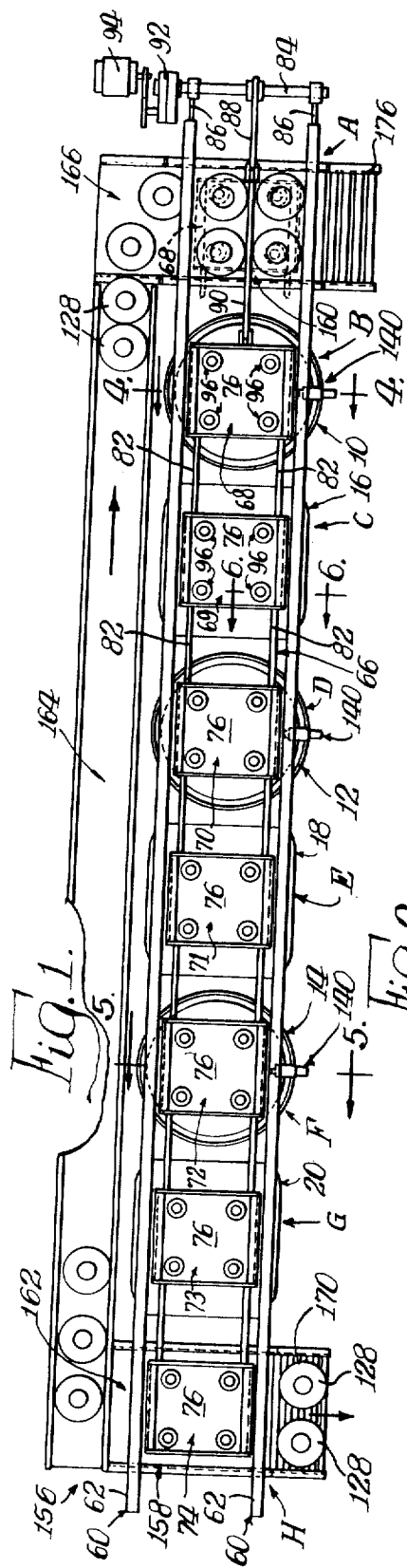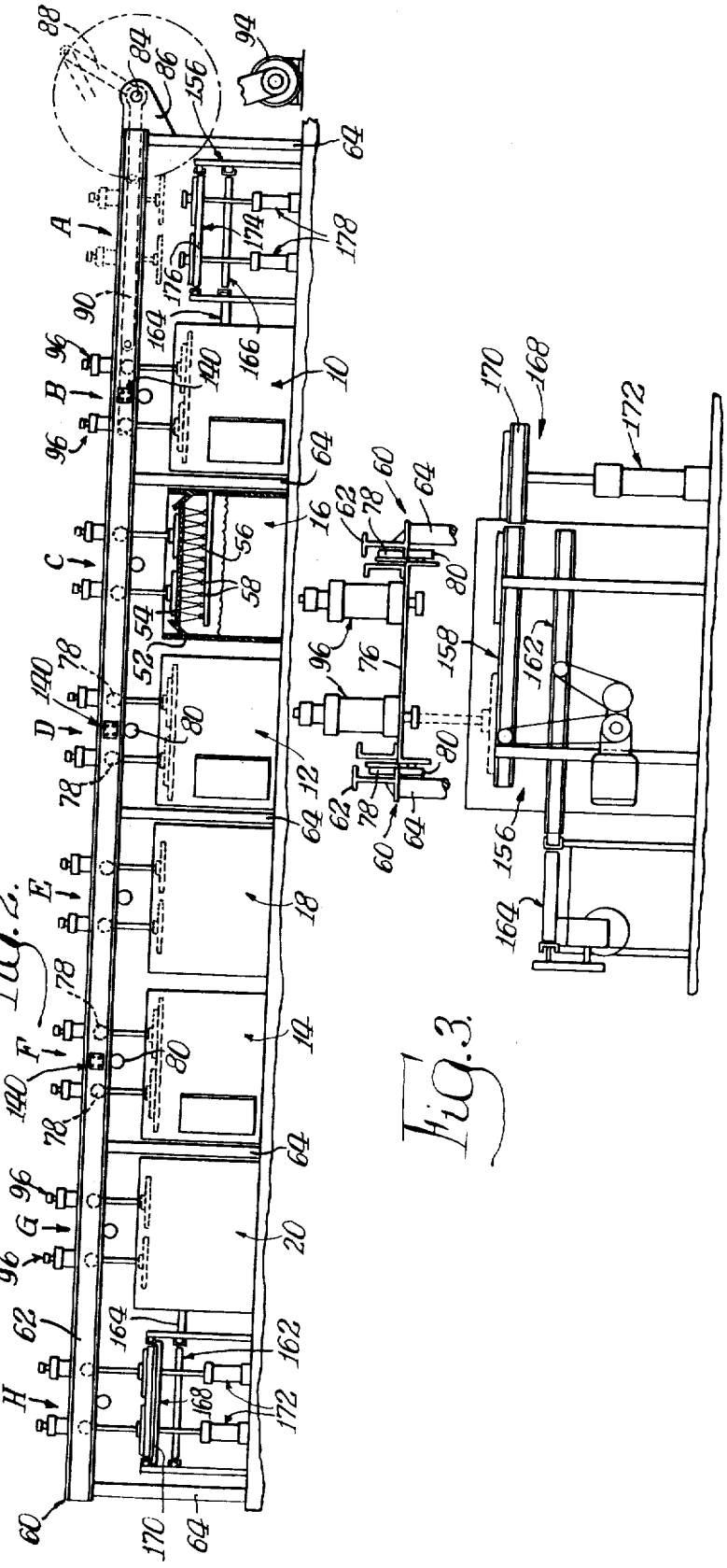

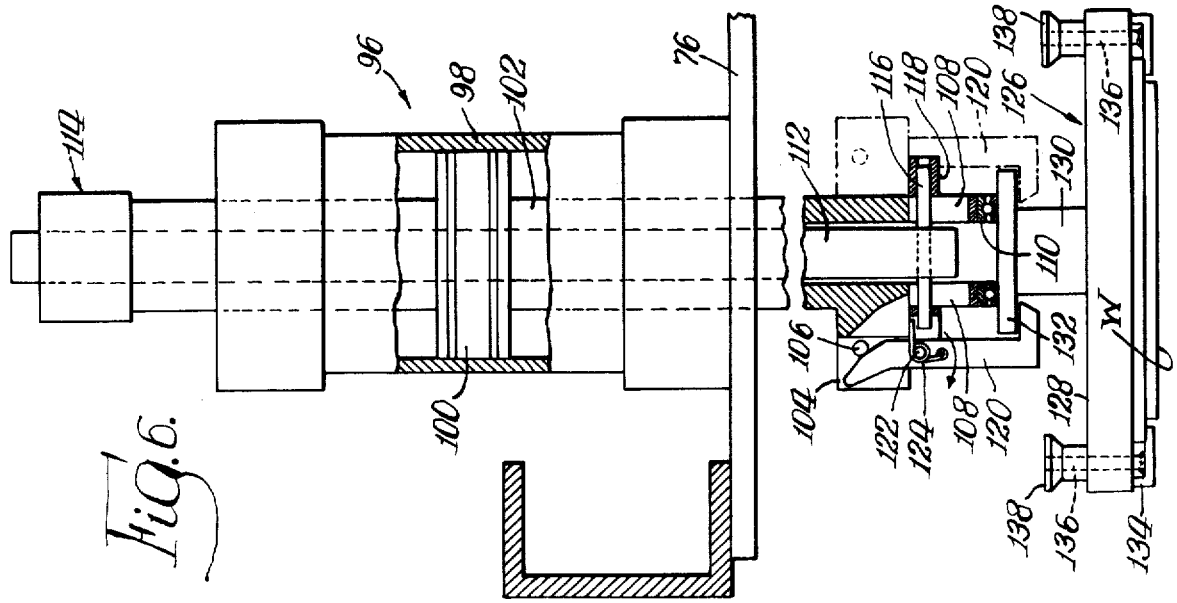
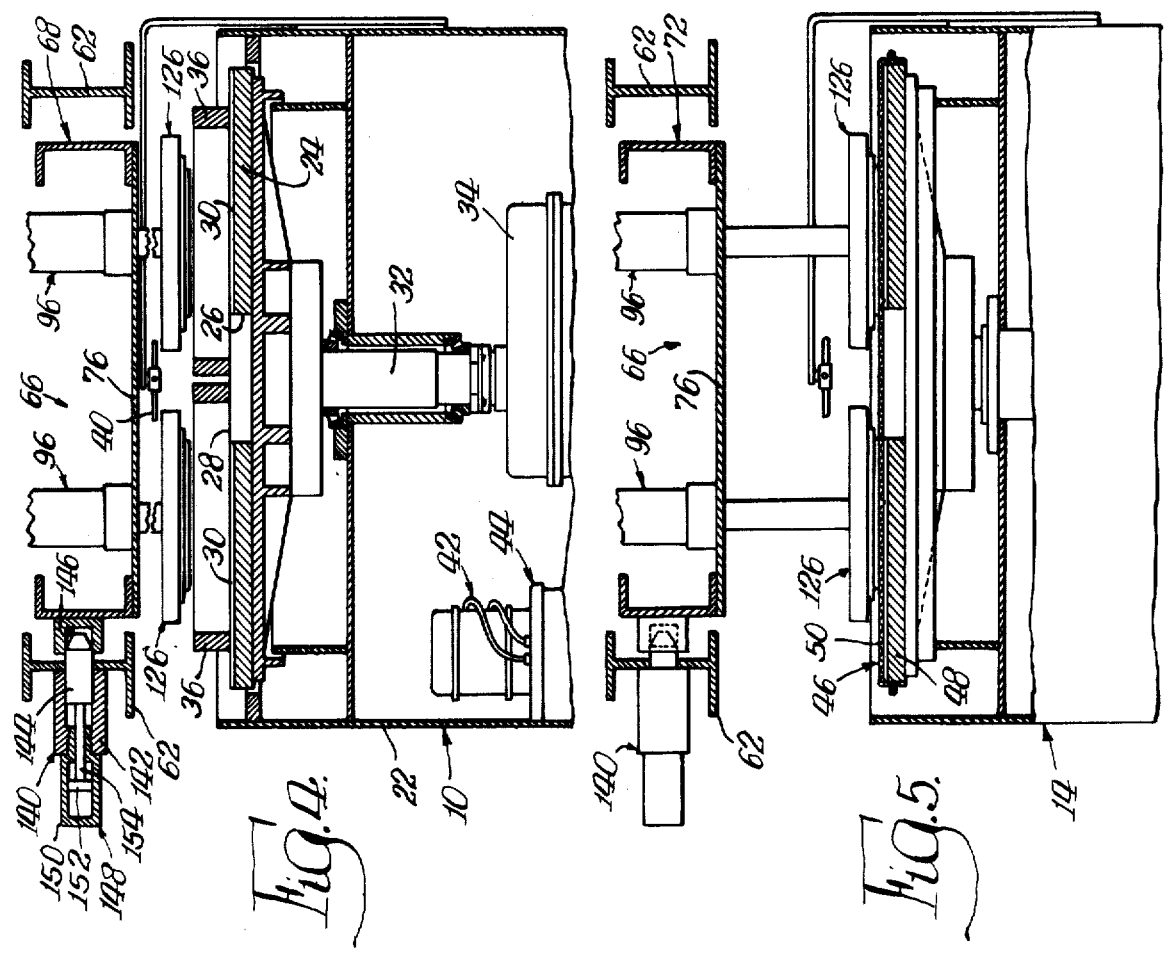

APPARATUS FOR MACHINING WORK PIECES

BACKGROUND OF THE INVENTION

1. Field of the Invention

The present invention relates to apparatus for automatic machining—lapping, polishing, or both—of work pieces.

2. Description of the Prior Art

Abrading machines are frequently used for machining work pieces. A conventional abrading machine comprises a horizontal rotatable abrading wheel assembly, and a plurality of stationary vertically disposed pneumatic assemblies mounted thereabove. In using this type of machine, several individual work pieces (or several groups of work pieces) to be machined are moved separately onto the abrading wheel, the pneumatic assemblies are actuated to forcibly urge the work pieces against the abrading wheel while the latter is rotating, and, after machining, the work pieces are moved off of the abrading wheel.

When work pieces are to be machined in steps—for example, first coarsely lapped and then finely lapped—each operation is frequently carried out in a separate abrading machine, and the work pieces are carried or transferred manually from one machine to the other.

The disadvantages of conventional apparatus and procedures are readily apparent. By way of illustration, loading and unloading time of each machine is relatively high in proportion to machining time and, when two or more machines are used in sequence, transfer of work pieces from one machine to another is laborious and time consuming.

SUMMARY OF THE INVENTION

In the apparatus of the present invention, vertically disposed pneumatic assemblies are mounted on carrier means movable horizontally and reciprocally above at least two work stations. The pneumatic assemblies are selectively actuatable to raise and lower pressure plates having work pieces secured thereto, to transfer the plates and work pieces from one work station to another work station, and to apply downward pressure on the plate members to forcibly urge the work pieces into operating engagement with an abrading machine disposed at one of the work stations.

More specifically, the apparatus defines a series of work stations—including a loading station, a plurality of machining and cleaning stations, and an unloading station—modularly spaced in a straight line. The carrier means includes a plurality of pneumatic assemblies at spaced sections therealong, and is reciprocated rectilinearly in periodic strokes with brief dwell periods at the work stations, whereby the pneumatic assemblies in sequence serve the dual functions of transferring or shuttling the pressure plates and work pieces successively from the loading station, through the machining and cleaning stations, to the unloading station and also of providing the downward forces required during the abrading periods. Additionally, indexing means are provided for positively locating the pneumatic assemblies at the machining stations. Also, a conveyor system extends between the unloading station and the loading station for returning pressure plates from the unloading station to the loading station.

With the apparatus of the present invention loading and unloading time of an abrading machine in relation to machining time is minimized, and work pieces are transferred automatically from one machine or work station to another for maximum efficiency.

BRIEF DESCRIPTION OF THE DRAWINGS

FIG. 1 is a plan view of the apparatus of the present invention;

FIG. 2 is a side elevational view of the apparatus of FIG. 1;

FIG. 3 is an end elevational view of the apparatus of FIG. 1;

FIG. 4 is a sectional view, on an enlarged scale, taken substantially along the line 4—4 in FIG. 1, looking in the direction indicated by the arrows;

FIG. 5 is a sectional view, on an enlarged scale, taken substantially along the line 5—5 in FIG. 1, looking in the direction indicated by the arrows; and FIG. 6 is an enlarged view, partly in section, taken substantially along the line 6—6 in FIG. 1, looking in the direction indicated by the arrows, and shows one of the pneumatic piston and cylinder assemblies and associated work piece plate means of the apparatus of the present invention.

DESCRIPTION OF THE PREFERRED EMBODIMENT

As shown in FIGS. 1 and 2, the apparatus of the present invention is arranged to define a plurality of horizontally spaced apart work stations A-H located in a straight line. In a manner to be presently described in detail, work pieces are loaded at station A, progressively transported from station A through stations B-G to station H, and unloaded at station H. Disposed at stations B and D are abrading or lapping machines 10 and 12; at station F, an abrading or polishing machine 14; and at stations C, E and G, wash machines 16, 18 and 20.

The lapping machine 10, as shown in FIG. 4, includes a framework with a housing 22 which provides support for a rotatable horizontal circular lapping member or disc 24. By way of illustration, the lapping disc may be of one-piece construction having a central well-bore 26, a horizontal operating or lapping surface 28 engageable by work pieces, and a plurality of radial slots 30 for conveying across the disc abrasive and carrier mixture used in the lapping operation. The lapping disc 24 is secured to the upper end of a vertical shaft 32, and these members are rotatable about a vertical axis by drive means which includes a gear reducer unit 34 and an electric motor (not shown). Resting on the lapping surface 28 are four truing rings 36. During lapping, a freely flowing mixture of relatively coarse abrasive particles and an oil carrier is fed to the lapping disc 24 through discharge tubes 40. The mixture is delivered to the tubes 40 through tubing 42 connected to a sump pump unit 44 located in the lower portion of the housing 22.

The lapping machine 12 is identical in construction and operation to the lapping machine 10, with the exception that the abrasive mixture or slurry fed to the lapping disc is comprised of relatively fine abrasive particles.

The polishing machine 14, as shown in FIG. 5, is similar to the lapping machine 10 with the following principal exceptions: The lapping disc is replaced by a rotatable polishing wheel member or assembly 46 comprised of an annular backing wheel 48 across the upper face of which extends a polishing cloth 50 presenting an operating surface engageable by work pieces; truing rings are absent; and the mixture fed to the polishing wheel assembly 46 comprises a suitable polishing compound suspended or mixed in water.

The wash machine 16, as shown in FIG. 2, includes a housing 52 in which near the top is mounted a horizontal wire mesh parts rack 54. Also supported in the housing 52 is a horizontal generally rectangular hollow casing 56 having a plurality of spray nozzles 58 mounted in the upper face thereof. A fluid pump (not shown) is connected between the lower portion of the housing 52 and the casing 56 for circulating a liquid solvent therebetween. From the casing 56, jet sprays of solvent are directed upwardly through the nozzles 58 to clean work pieces positioned on the parts rack 54. The wash machines 18 and 20 are identical in construction and operation to the wash machine 16.

Extending lengthwise at the sides of the work stations A-H, as shown in FIGS. 1, 2 and 3, are a pair of transversely spaced side frames 60 which each comprise a horizontal I-beam 62 joined to the upper ends of vertical posts 64. Supported by the side frames 60, and reciprocally movable horizontally and rectilinearly above the work stations A-H, is carrier means 66 comprised of a plurality of sections or carriages 68–74 which number one less than the number of work stations. Each carriage 68–74 comprises a rectangular frame 76, four rollers 78 supported on the flanges of the I-beams 62, and two reaction rollers 80 underlying the flanges of the I-beams 62. The carriages 68–74 are respectively interconnected for conjoint reciprocal movement by means of bar members 82. Means for effecting reciprocal movement of the carrier means 66, which includes the sections or carriages 68–74, comprises a transverse shaft 84 journaled in brackets 86 mounted at the ends of the side frames 60. A crank arm 88 is secured at its inner end to the shaft 84, and a lever 90 is pivotally connected between the outer end of the crank arm 88 and the carriage 68. During rotation of the shaft 84, the crank arm 88 is revolved and the lever 90 serves to move or shuttle each of the carriages 68–74 back-and-forth between two work stations. Intermittent rotation of the shaft 84 with brief dwell periods is effected by a conventional Geneva-like drive mechanism 92 operatively connected to an electric motor 94.

Mounted on each carriage 68–74 is a group or set of four vertically disposed power actuated means in the form of double-acting fluid (preferably pneumatic) piston and cylinder assemblies 96. Each pneumatic assembly 96, as shown in FIG. 6, includes a cylinder 98, an annular piston head 100, and a tubular piston rod 102 extending through the cylinder 98 and the carrier frame 76. The lower end of the piston rod 102 is formed with a flange 104 having guide pins 106, and vertical slots 108; and is provided with a ball thrust bearing 110. Extending through the piston rod 102 is an actuator rod 112 which is axially movable by means of a fluid (preferably pneumatic) actuator or assembly 114 mounted at the upper end of the piston rod 102. Secured in the lower end of the actuator rod 112 is a transverse pin 116 which is slidable in the piston rod slots 108, and on the ends of which is mounted a ring 118. Carried by the ring member 118 are three latch members 120 each of which is pivotally mounted on an axis 122 and has associated therewith a torsion spring 124.

The latch members 120 and associated elements serve as engagement or latch means selectively operable to engage and disengage plate means 126 in the form of a pallet or pressure plate 128 having a central stem 130 with an elevated collar 132. A work piece W is adapted to be secured to the underside of the pressure plate 128 by means of a circumferentially continuous ring clamp 134 releasably held in place by a plurality of circumferentially spaced apart threaded members 136 and thumb nuts 138. The pressure plate 128 is adapted to fit with slight clearance within a truing ring 36. As shown in FIG. 6, the pallet collar 132 is engaged by and between the latch members 120 and the ball thrust bearing 110, and the plate means 126 is movable vertically with the piston rod 102 and horizontally with the pneumatic assembly 96 and associated carrier means 66. When the actuator rod 112 is urged downwardly relative to the piston rod 102, the transverse pin 116, the ring member 118, and the latch members 120, are carried downwardly therewith. Concurrently, the torsion springs 124 effect pivotal movement of the latch members 120 whereby the lower ends of the latter are swung outwardly and unlatched or disengaged from the pallet collar 132. Thereafter, the piston rod 102 may be elevated, and the pneumatic assembly 96 moved horizontally, independently of the plate means 126. To reengage the plate means 126, the piston rod 102 is moved downwardly, with the lower ends of the latch members 120 swung outwardly, until the bearing 110 is engaged against the pallet collar 132. Then, the actuator rod 112 is raised relative to the piston rod 102, and the transverse pin 116, the ring member 118, and the latch members 120, are returned to the latched or engaged position shown in FIG. 6. The 28 pneumatic assemblies 96 are connected in parallel for simultaneous actuation, and the 28 pneumatic assemblies 114 are likewise connected in parallel for simultaneous actuation.

As shown in FIG. 1, indexing means 140 is provided at the three work stations B, D and F. Each indexing means 140, as shown in FIG. 4, comprises a guide casing 142 secured to the adjacent I-beam 62. Slidably mounted in the guide casing 142 is a plunger 144 which is adapted to be engaged in an adjacent indexing recess 146 provided at the sides of the carriages 68, 70 and 72. Each indexing plunger 144 is movable axially by means of power actuated means in the form of a double acting fluid (preferably pneumatic) piston and cylinder assembly 148 mounted to the guide casing 142. Each pneumatic assembly 148 comprises a cylinder 150, a piston head 152 and a piston rod 154. The three pneumatic assemblies 148 are connected in parallel for simultaneous actuation.

Extending between the unloading station H and the loading station A is a conveyor system 156 which serves to return the pallet or pressure plates 128 from the unloading station to the loading station. As shown in FIGS. 1, 2 and 3, the conveyor system 156 comprises a transverse power driven belt conveyor 158 at the unloading station H, and a similar transverse power driven belt conveyor 160 at the loading station A and at the same level as the belt conveyor 158. Additionally, extending between the unloading station H and the loading station A beneath the level of the belt conveyors 158 and 160 are conveyor means comprised of a transverse power driven belt conveyor 162 at the unloading station H, a longitudinal power driven belt conveyor 164, and a transverse power driven belt conveyor 166 at the loading station A. It will be appreciated that other forms of conveyors, such as power driven roller conveyors, may be substituted for the power driven belt conveyors. Arranged at the adjacent ends of the belt conveyors 158 and 162 is elevator means 168 comprised of a roller platform 170 supported, and vertically movable, by means of a pair of vertically disposed power actuated means in the form of fluid (preferably pneumatic) piston and cylinder assemblies 172. Correspondingly, arranged at the adjacent ends of the belt conveyors 160 and 166 is elevator means 174 comprised of a roller platform 176 supported, and vertically movable, by means of a pair of vertically disposed power actuated means in the form of fluid (preferably pneumatic) piston and cylinder assemblies 178. The elevator means 168 serves to lower a pair of pressure plates 128 from the level of the belt conveyor 158 to the level of the belt conveyor 162; while the elevator means 174 serves to raise a pair of pressure plates 128 from the level of the belt conveyor 166 to the level of the belt conveyor 160. The conveyor system 156 is intermittently operated to accommodate movement of the pressure plates 128 in pairs to and from the roller platforms 170 and 176.

There will now be described the steps involved in finishing work pieces with the above described apparatus in accordance with the principles of the present invention.

At the roller platform 176, work pieces to be finished are manually secured to successive pairs of pressure plates 128, and the four plates and work pieces are placed on the belt conveyor 160 which moves them into position at work station A. Concurrently, the carriage 68 is positioned above work station A in the dotted line position shown in FIG. 1. Then, the piston rods 102 of the pneumatic assemblies 96 associated with the carriage 68 are lowered and engaged with the pressure plates 128, the piston rods 102 are retracted and the pressure plates 128 and work pieces secured thereto are raised, and the carriage 68 is moved to the left, from the dotted line position to the solid line position shown in FIG. 1, with the associated pneumatic assemblies 96 serving to transfer the pressure plates 128 and work pieces secured thereto from work station A to work station B.

At work station B, the pressure plates 128 and work pieces secured thereto are lowered within the four truing rings 136 of the lapping machine 10. At this time, the pneumatic assemblies 96 of carriage 68 serve to apply downward pressure on the plates 128 to forcibly urge the work pieces against the lapping surface 28 of the lapping machine 10, while the lapping disc 24 is rotated for coarsely lapping the work pieces. Then, the pressure plates 128 are released, the piston rods 102 are retracted, and the carriage 68 is returned to work station A while the carriage 69 is moved to work station B. Next, the piston rods 102 of the pneumatic assemblies 96 associated with the carriage 69 are lowered and engaged with the pressure plates 128, the piston rods 102 are retracted and the pressure plates 128 and work pieces secured thereto are raised, and the carriage 69 is moved to work station C, with the associated pneumatic assemblies 96 serving to transfer the pressure plates 128 and work pieces secured thereto from work station B to work station C.

At work station C, the pressure plates 128 are lowered within the housing 52 of the wash machine 16 onto the parts rack 54. Next, jet sprays of solvent are directed upwardly against the lower surfaces of the work pieces to remove abrasive mixture and other foreign matter. Then, pressure plates 128 are released, the piston rods 102 are retracted, and the carriage 69 is returned to work station B while the carriage 70 is moved to work station C. Next, the piston rods 102 of the pneumatic assemblies 96 associated with the carriage 70 are lowered and engaged with the pressure plates 128, the piston rods 102 are retracted and the pressure plates 128 and work pieces secured thereto are raised, and the carriage 70 is moved to work station D, with the associated pneumatic assemblies 96 serving to transfer the pressure plates 128 and work pieces secured thereto from work station C to work station D.

At work station D, the pressure plates 128 and work pieces secured thereto are lowered within the four truing rings of the lapping machine 12. While the pneumatic assemblies 96 of carriage 70 serve to apply downward pressure on the plates 128 to forcibly urge the work pieces against the lapping surface of the lapping machine 12, the lapping disc is rotated for finely lapping the work pieces. Then, the pressure plates 128 are released, the piston rods 102 are retracted, and the carriage 70 is returned to work station C while the carriage 71 is moved to work station D. Next, the piston rods 102 of the pneumatic assemblies 96 associated with the carriage 71 are lowered and engaged with the pressure plates 128, the piston rods 102 are retracted and the pressure plates 128 and work pieces secured thereto are raised, and the carriage 71 is moved to work station E, with the associated pneumatic assemblies 96 serving to transfer the pressure plates 128 and work pieces secured thereto from work station D to work station E.

At work station E, the pressure plates 128 are lowered within the housing of the wash machine 18 onto the parts rack. Next, jet sprays of solvent are directed upwardly against the lower surfaces of the work pieces to remove abrasive mixture and other foreign matter. Then, the pressure plates 128 are released, the piston rods 102 are retracted, and the carriage 71 is returned to work station D while the carriage 72 is moved to work station E. Next, the piston rods 102 of the pneumatic assemblies 96 associated with the carriage 72 are lowered and engaged with the pressure plates 128, the piston rods 102 are retracted and the pressure plates 128 and work pieces secured thereto are raised, and the carriage 72 is moved to work station F, with the associated pneumatic assemblies 96 serving to transfer the pressure plates 128 and work pieces secured thereto from work station E to work station F.

At work station F, the pressure plates 128 and work pieces secured thereto are lowered, with the pneumatic assemblies 96 of carriage 72 serving to apply downward pressure on the plates 128 to forcibly urge the work pieces against the upper surface of the polishing assembly 46 of the polishing machine 14, and the polishing wheel assembly 46 is rotated for polishing the work pieces. Then, the pressure plates 128 are released, the piston rods 102 are retracted, and the carriage 72 is returned to work station E while the carriage 73 is moved to station F. Next, the piston rods 102 of the pneumatic assemblies 96 associated with the carriage 73 are lowered and engaged with the pressure plates 128, the piston rods 102 are retracted and the pressure plates 128 and work pieces secured thereto are raised, and the carriage 73 is moved to work station G, with the associated pneumatic assemblies 96 serving to transfer the pressure plates 128 and work pieces secured thereto from work station F to work station G.

At work station G, in sequence, the pressure plates 128 are lowered within the housing of the wash machine 20 onto the parts rack, jet sprays of solvent are directed upwardly against the lower surfaces of the work pieces to remove polishing compound and other foreign matter, the pressure plates 128 are released, the piston rods 102 are retracted, and the carriage 73 is returned to work station F while the carriage 74 is moved to work station G. Next, the piston rods 102 of the pneumatic assemblies 96 associated with the carriage 74 are lowered and engaged with the pressure plates 128, the piston rods 102 are retracted and the pressure plates 128 and work pieces secured thereto are raised, and the carriage 74 is moved to work station H, with the associated pneumatic assemblies 96 serving to transfer the pressure plates 128 and work pieces secured thereto from work station G to work station H.

At work station H, the pressure plates 128 are lowered onto the belt conveyor 158, the pressure plates 128 are released, the piston rods 102 are retracted, and the carriage 74 is returned to work station G. At the same time, the belt conveyor 158 moves successive pairs of plates 128 and work pieces onto the roller platform 170. Then, the finished work pieces are manually removed from the pressure plates 128, the plates 128 alone are repositioned on the roller platform 170, the platform 170 is lowered to the level of the belt conveyor 162, the plates 128 are pushed onto the conveyor 162, and the platform 170 is raised to the level of the conveyor 158. The plates 128 are returned, by the belt conveyors 162, 164 and 166, to the loading station A, the roller platform 176 is lowered to the level of the conveyor 166, successive pairs of plates 128 are moved onto the platform 176 by the conveyor 166, and, finally, the platform 176 is raised to the level of the belt conveyor 160 where work pieces to be finished can again be manually secured to the plates 128.

This completes the description of one complete cycle of operation of the apparatus of the present invention. In one cycle, work pieces are loaded, coarsely lapped, cleaned, finely lapped, cleaned, polished, cleaned and unloaded. During the finishing operation, as the carrier means 66 is reciprocated rectilinearly in periodic strokes with brief dwell periods, the pneumatic assemblies 96 in sequence serve to transfer or shuttle the pressure plates and work pieces successively from one work station to the next work station.

During reciprocal movement of the carrier means 66, the three indexing plungers 144 are maintained disengaged from the adjacent indexing recesses 146. During each dwell period, the indexing plungers 144 are engaged in the adjacent indexing recesses 146 for positively and accurately aligning the pneumatic assemblies 96 at stations B, D and F with the adjacent abrading machines 10, 12 and 14 to attain precision lapping and polishing.

In the normal sequence of operation, work pieces are successively introduced into the finishing cycle at work station A. Therefore, at any given time, except at the initiation or termination of operations, there will be a group of work pieces at each work station in a different stage of the finishing cycle. It will be appreciated that, depending upon finishing and other operational requirements, the number and type of work stations may be increased, decreased, or altered, as desired. Moreover, the work piece securing means associated with each pressure plate 128 may be modified to accommodate single work pieces of different sizes and shapes, or even two or more work pieces each of smaller size than work piece W. All of the pneumatic assemblies of the above described apparatus are supplied air under pressure from a conventional pump and through a conventional control system (not shown). Suitable known valves are incorporated in the control system to control actuation of the various pneumatic assemblies, and conventional electrical circuitry is employed to control the proper sequence of operation of the various motors and the valves associated with the pneumatic assemblies.

While there has been shown and described what is believed to be a preferred embodiment of the present invention, it will be understood by those skilled in the art that various rearrangements and modifications may be made therein without departing from the spirit and scope of the invention.

The invention claimed is:

1. Apparatus for finishing the surface of work pieces and defining at least two horizontally spaced apart work stations, comprising a rotatable member with a horizontal operating surface disposed at one of said work stations for engagement by work pieces, carrier means movable horizontally above said two work stations, means for reciprocally moving said carrier means between said two work stations, at least one horizontally disposed plate means to which at least one work piece is adapted to be secured on the underside thereof, vertically disposed power actuated means carried by said carrier means for selectively raising and lowering said plate means, said power actuated means selectively serving to transfer said plate means and work piece secured thereto from one of said work stations to the other of said work stations upon movement of said carrier means, and said power actuated means selectively serving to apply downward pressure on said plate means to forcibly urge the work piece secured thereto against said horizontal operating surface of said rotatable member.

2. The apparatus of claim 1 wherein said power actuated means includes engagement means selectively operable to engage and disengage said plate means.

3. The apparatus of claim 1 wherein a plurality of horizontally spaced apart work stations are defined, at least two rotatable members with horizontal operating surfaces are disposed at two of said work stations for engagement by work pieces, said carrier means is movable horizontally above said plurality of work stations, at least two vertically disposed power actuated means are carried by said carrier means and include engagement means selectively operable to engage and disengage said plate means, one of said power actuated means serves to transfer said plate means and work piece secured thereto from one work station to a second work station, and the other of said power actuated means serves to transfer said plate means and work piece secured thereto from said second work station to a third work station.

4. The apparatus of claim 3 wherein said work stations are arranged in a straight line, said carrier means is movable rectilinearly above said work stations, said means for moving said carrier means effects reciprocal movement of the latter in periodic strokes with brief dwell periods, and said power actuated means each comprise a fluid piston and cylinder assembly.

5. The apparatus of claim 4 wherein said carrier means comprises a plurality of sections which number one less than the number of work stations, at least one pneumatic piston and cylinder assembly is carried by each of said sections, each of said pneumatic assemblies includes engagement means selectively operable to engage and disengage said plate means, and said pneumatic assemblies sequentially serve to transfer said plate means and work piece secured thereto from one work station to the next work station.

6. The apparatus of claim 5 including a group of pneumatic piston and cylinder assemblies carried by each of said sections, and a group of plate means to each of which at least one work piece is adapted to be secured on the underside thereof; and wherein each of said pneumatic assemblies includes engagement means selectively operable to engage and disengage said plate means, and said groups of pneumatic assemblies sequentially serve to transfer said group of plate means and work pieces secured thereto from one work station to the next work station.

7. The apparatus of claim 6 including indexing means for positively locating the groups of pneumatic assemblies at the work stations where said rotatable members are disposed.

8. The apparatus of claim 7 wherein said indexing means comprises at least one power actuated plunger selectively engageable with said carrier means.

9. The apparatus of claim 8 wherein each of said plate means includes an elevated collar, and each of said engagement means comprises latch means releasably engageable with one of said elevated collars.

10. The apparatus of claim 9 wherein a plurality of horizontally spaced apart work stations including a loading station and an unloading station are defined, and a conveyor system extends between said unloading station and said loading station for returning plate means from said unloading station to said loading station.

11. The apparatus of claim 10 wherein said conveyor system comprises first conveyor means at said unloading station, second conveyor means at said loading station at the same level as said first conveyor means, third conveyor means extending between said unloading and loading stations beneath the level of said first and second conveyor means, first elevator means for lowering plate means from the level of said first conveyor means to the level of said third conveyor means, and second elevator means for raising plate means from the level of said third conveyor means to the level of said second conveyor means.

* * * * *